Aug. 25, 1925.
L. A. BLOCK
PNEUMATIC TIRE
Filed April 17, 1924
1,551,460
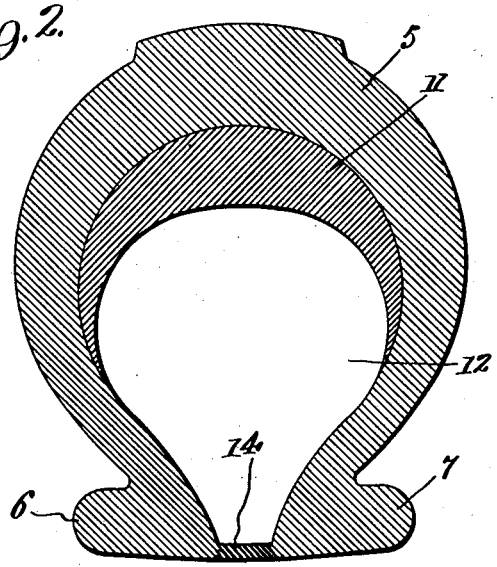
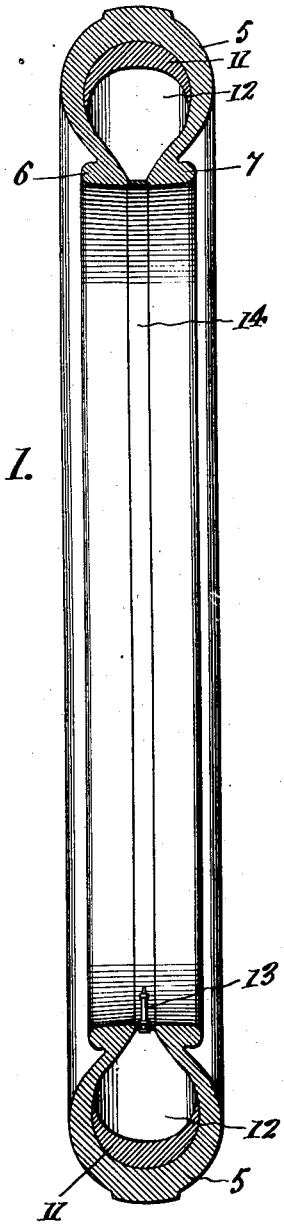
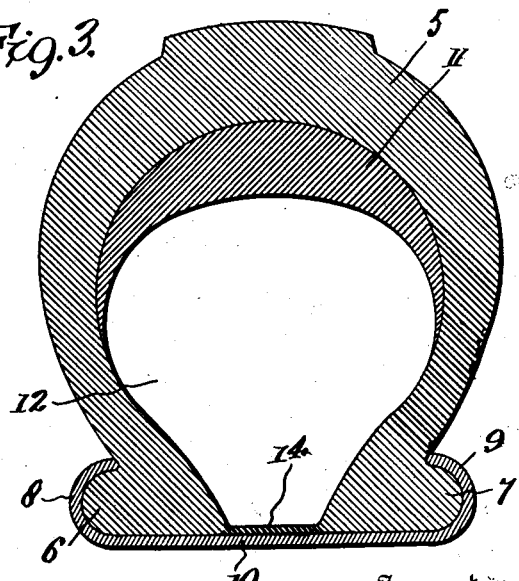
Inventor
Louis A. Block
by Wilkinson & Fiuota
Attorneys.

Patented Aug. 25, 1925.

1,551,460

UNITED STATES PATENT OFFICE.

LOUIS ADRIEN BLOCK, OF NEW ORLEANS, LOUISIANA.

PNEUMATIC TIRE.

Application filed April 17, 1924. Serial No. 707,189.

*To all whom it may concern:*

Be it known that I, LOUIS ADRIEN BLOCK, a citizen of the United States, residing at New Orleans, in the parish of Orleans and State of Louisiana, have invented certain new and useful Improvements in Pneumatic Tires; and I do hereby declare the following to be a full, clear, and exact description of the invention, such as will enable others skilled in the art to which it appertains to make and use the same.

The present invention relates to improvements in pneumatic tires and has for an object to reinforce and provide a substantially puncture proof tire in which the use of inner tubes is entirely dispensed with.

Other objects of the invention are to simplify, and decrease the cost, of the manufacture of vehicle tires; to provide a tire in which the tread portion is of increased thickness without enlarging the outer dimension of the tire whereby to offer a greater obstacle to the puncturing of the tire by nails or other sharp objects; to provide a tire which will yield additional comfort and easy riding and which will protect the running gear and other parts of the vehicle from shocks and jars.

With the foregoing and other objects the invention consists in the constructions, arrangements and combination of parts, all as hereinafter described and claimed.

In the drawings, wherein only a single embodiment of the invention is illustrated.

Figure 1 is a cross section of the complete tire apart from the vehicle.

Figure 2 is an enlarged section through a portion of the tire disassociated from the rim, and Figure 3 is a similar view showing the tire inflated and in place on the vehicle rim.

Referring more particularly to the drawings 5 designates the casing or shoe which is externally of the usual standard form having the beads 6 and 7 which cooperate in a well known manner with the clincher or other flanges 8 and 9 of the rim 10.

In accordance with the present invention the usual practice of building the tire is not essentially departed from, except for the fact that the tread portion is enlarged upon on the inner part of the tire providing an additional thickness indicated at 11.

The depth of this additional material will be governed by the size of the tire, the weight to be sustained and other considerations, but it is preferable to build into the tire at this tread portion a substantial increase in the tire wall in order to offer a sufficiently deep wall to prevent penetration into the internal air space 12 of any object likely to be encountered.

The inner tube, now universally used, is entirely dispensed with and the internal wall of the shoe provides the air chamber of restricted cross section and the air is pumped into this chamber through the valve stem 13 of usual form. The pressure of the air will vary in accordance with the load to be carried, the cross section, weight etc., all as governed substantially by present practice.

I further provide in connection with the inner edges of the beads 6 and 7 a highly resilient flexible web 14 which is stretched across the gap between the beads and is adapted to lie flat against the rim 10 whereby to provide a continuous wall all about the air chamber 12 to avoid the leakage of air and the entrance of water or moisture into the air chamber. It will be noted that this web 14, which is preferably made from some such material as is used at the present time for the manufacture of inner tubes, although advantageously of greater thickness, lies at substantially the base or lowermost portion of the air chamber and allows the pressure within the chamber free access to the inner walls of the beads 6 and 7 to the end that this pressure will be constantly exerted in an outward direction upon both beads, forcing the heads into the clincher flanges 8 and 9 of the rim 10 and preventing these beads from accidentally working out of the rim as when turning corners. In other words the invention provides the same firmness in holding the tire upon the rim as is provided by present standard tires with the use of the inner tube which enters this gap between the two beads. However the expense and the annoyance attended with the use of the inner tube is entirely done away with and the air space within the tire is also reduced while building up the tread and a portion of the side wall of the tire where the tire is subjected to penetration by obstacles in the road.

The valve stem 13 may be mounted at any convenient point or part of the tire, but it is preferably secured through the web 14 and as shown in Figure 1 this web extends entirely about the tire beads or is continuous throughout. The edges of the web are united with the beads in any appropriate manner.

In the use of the device the tire in the deflated condition shown in Figures 1 and 2 is mounted upon the demountable rim 10 by first inserting the valve stem 13 through the opening made in the rim to receive it and subsequently forcing the beads of the tire over the flanges of the rim. The web 14 will normally tend to contract somewhat the beads 6 and 7 so that these beads may be more readily made to enter beneath the flanges 8 and 9 of the rim. The valve stem 13 is then connected with an air hose or pump and inflated to a desired degree. During this inflation the chamber 12 receives and retains the air pressure directly without involving the use of a separate inner tube therein and the web 14 retains this pressure at the gap without interfering with the spreading of the beads 6 and 7. In fact the web 14 allows the pressure further access to the inner walls of the beads 6 and 7 the pressure acting at substantially right angles to force the beads directly outward and into the flanges 8 and 9.

Escape from these flanges is impracticable in use so long as the pressure is retained in the chamber 12 and this pressure is not apt to escape owing to the additional thickness 11 of the tread portion of the tire and the substantial impenetrability of the tire occasioned thereby.

It will be appreciated from the foregoing that the tire constructed according to the present invention will be less open to puncture, easier to adjust to the rim and of greatly superior riding qualities to the tires at present in use.

I wish it understood that the drawings and the foregoing description refer to only one form of which the invention is susceptible and I reserve the right to make such changes as fall within the scope of the following claim:

What is claimed is:—

The combination with a rim having flanges, of a pneumatic tire having beads fitting the flanges of the rim, said beads having a gap therebetween, and an elastic and yieldable web extending annularly all about the tire at substantially the base of the gap between the beads and being secured to the beads whereby to provide an air and moisture tight enclosure for the air chamber while allowing access of the air pressure to the interior walls of the beads whereby to expand the beads into the rim flanges, said web being under tension and tending to draw the beads together and lying in contact with the rim.

LOUIS ADRIEN BLOCK.